US012359460B2

(12) United States Patent
Chen

(10) Patent No.: US 12,359,460 B2
(45) Date of Patent: Jul. 15, 2025

(54) DOOR LOCK

(71) Applicant: Jeff Chen, Chiayi County (TW)

(72) Inventor: Jeff Chen, Chiayi County (TW)

( * ) Notice: Subject to any disclaimer, the term of this patent is extended or adjusted under 35 U.S.C. 154(b) by 263 days.

(21) Appl. No.: 18/073,490

(22) Filed: Dec. 1, 2022

(65) Prior Publication Data

US 2023/0193654 A1 Jun. 22, 2023

(30) Foreign Application Priority Data

Dec. 17, 2021 (TW) ................................ 110215131

(51) Int. Cl.

| | |
|---|---|
| ***E05B 9/02*** | (2006.01) |
| ***E05B 15/04*** | (2006.01) |
| ***E05B 63/00*** | (2006.01) |
| *E05B 9/00* | (2006.01) |

(52) U.S. Cl.

CPC ................ *E05B 9/02* (2013.01); *E05B 15/04* (2013.01); *E05B 63/0017* (2013.01); *E05B 2009/006* (2013.01); *E05B 2015/0406* (2013.01); *E05B 2015/0437* (2013.01)

(58) Field of Classification Search

CPC ... E05B 9/02; E05B 9/08; E05B 9/082; E05B 9/084; E05B 15/04; E05B 63/0017; E05B 2009/006; E05B 2015/0406; E05B 2015/0437; Y10T 292/0854; Y10T 292/854; Y10T 292/85; Y10T 292/876

See application file for complete search history.

(56) References Cited

U.S. PATENT DOCUMENTS 3,992,908 A * 11/1976 Crepinsek ................ E05B 9/08 70/451
5,186,030 A * 2/1993 Lin ..................... E05B 63/0017 70/381
5,316,353 A * 5/1994 McKernan .......... E05B 63/0017 70/448
2017/0275917 A1* 9/2017 Murphy .................. E05B 1/003

FOREIGN PATENT DOCUMENTS

KR 20190007249 A * 1/2019

* cited by examiner

*Primary Examiner* — Christine M Mills
*Assistant Examiner* — Christopher F Callahan
(74) *Attorney, Agent, or Firm* — Ying-Ting Chen

(57) ABSTRACT

A door lock, assembled in a door sheet, is provided, wherein the door lock has a latch, a first locking mechanism, and a second locking mechanism, wherein the door lock is adapted to be assembled on the door sheet through coupling the first locking mechanism and the second locking mechanism onto the latch. The first locking mechanism and the second locking mechanism have a spiral resilient member screw and abut on a bulge so as to lock the first locking mechanism and the second locking mechanism corresponding to the door sheet. At the same time, an engaging member of the second locking mechanism can both resiliently abut against an upper engaging member and a lower engaging member of the first locking mechanism, so as to limit the lateral movement of the first locking mechanism and the latch, which is not only assembled conveniently. Besides, the engaging and abutting structures among the engaging member, the upper engaging member, and the lower engaging member as well as the spiral resilient member and the bulge are very simple and effective.

4 Claims, 6 Drawing Sheets

DOOR LOCK

BACKGROUND OF THE PRESENT INVENTION

Field of Invention

The present invention relates to a door lock, and, in particular, to a door lock assembled from the outer side, inner side, and lateral margin of a door sheet at the same time.

Description of Related Arts

It is notable that there are numerous types of door lock in the market, such as Taiwan Pat. No. 83208619, 85200268, and 101207351 as well as U.S. patent Ser. No. 11/059,765 and 09/392,525, and etc. The disclosed structures of door lock are often utilized for regular household door lock, which allow a user to lock or unlock the door lock through using a key from the outside of the door or turning the lock from inside of the door. In addition, technologies revealed by Taiwan Pat. No. 108206360 and 107215303 are often utilized in locks of the above mentioned purposes as well.

Referring to FIG. 1, a perspective view of a conventional door lock assembled on a door is illustrated. A conventional door lock 1 (e.g. a lock, as disclosed in the above mentioned cases) with similar or different structure basically includes an inner locking member 11, an outer locking member 12, and a latch 13. The inner locking member 11 and the outer locking member 12 are opposite assembled and coupled with each other respectively from the inside and outside of the door sheet 14. The latch 13 is assembled between the inner locking member 11 and the outer locking member 12 through the lateral margin of the door sheet 14. A face plate 131 of the latch 13 has to be screwed on the door sheet 14 through two screws 15. Because the consumer has to buy a door lock 1 of this type and assemble it by himself or herself at home with a simple screw driver in most cases; namely, the user has to manually utilize the screw driver to drive the screws into the door sheet 14 so as to secure the face plate 131, hence, there is a drawback in troublesome assembling. Further, referring to the case of Taiwan Pat. No. 109112142, entitled door lock, it mainly improves on the drawback of troublesome assembling of the above-mentioned door lock that requires screwing to fix the latch 13. Although this prior art achieves the object of convenient assembling, its drawback is complex structure.

SUMMARY OF THE PRESENT INVENTION

Hence, an object of the present invention is to provide a door lock with a simpler structure.

Accordingly, it provides a door lock, adapted for being assembled on a door sheet, wherein the door sheet has a first surface, a second surface, a lateral margin, an assembling hole penetrating the first surface and the second surface, and a latch slot concavely arranged on the lateral margin, wherein the latch slot is connected and communicated with the assembling hole, wherein the door lock comprises a latch, a first locking mechanism, and a second locking mechanism. The latch assembled in the latch slot and extended into the assembling hole and has a core lock hole and two guide holes. The first locking mechanism is adapted for being assembled in the assembling hole from the first surface of the door sheet, and comprises an outer lock member, a linkage bar pivoted on said outer lock member, two guide bars extended from said outer lock member, an upper engaging member and a lower engaging member respectively protrudingly arranged from said outer lock member, and a buckle member, wherein said linkage bar is adapted to penetrate said core lock hole, wherein said guide bars respectively pass through said guide holes, wherein said upper engaging member has a first upper engaging portion, wherein said lower engaging member has a first lower engaging portion, wherein said first upper engaging portion and said first lower engaging portion are opposite arranged in a top and bottom manner, wherein said buckle member has a pipe and a bulge protruded from the inside of said pipe. The second locking mechanism is arranged on the second surface of the door sheet and comprises an inner cover, a rotating member penetrating said inner cover to connect with said linkage bar, a turning member pivotally arranged on said inner cover, a spiral resilient member connected with said turning member, and an engaging member arranged on said inner cover, wherein said spiral resilient member is arranged in said pipe in a penetrating manner and adapted to be driven by said turning member to screw and abut against said bulge, wherein said engaging member has an upper engaging section and a lower engaging section arranged in parallel and up and down manner with each other, and respectively abut and contact with said first upper engaging portion and said first lower engaging portion. According to the present invention, as long as the first locking mechanism and the second locking mechanism of the door lock couple with each other onto the latch on the door sheet, the engaging member will automatically abut against and engage with the upper engaging member and the lower engaging member, so as to limit the lateral movement of the first locking mechanism and the latch. At this time, turning the turning member can lock the latch, the first locking mechanism, and the second locking mechanism all on the door sheet, which is assembled conveniently. Besides, the engaging and abutting structures among the engaging member, the upper engaging member, and the lower engaging member as well as the spiral resilient member and the bulge are very simple and effective.

DETAILED DESCRIPTION OF THE PREFERRED EMBODIMENT

Figure 1:
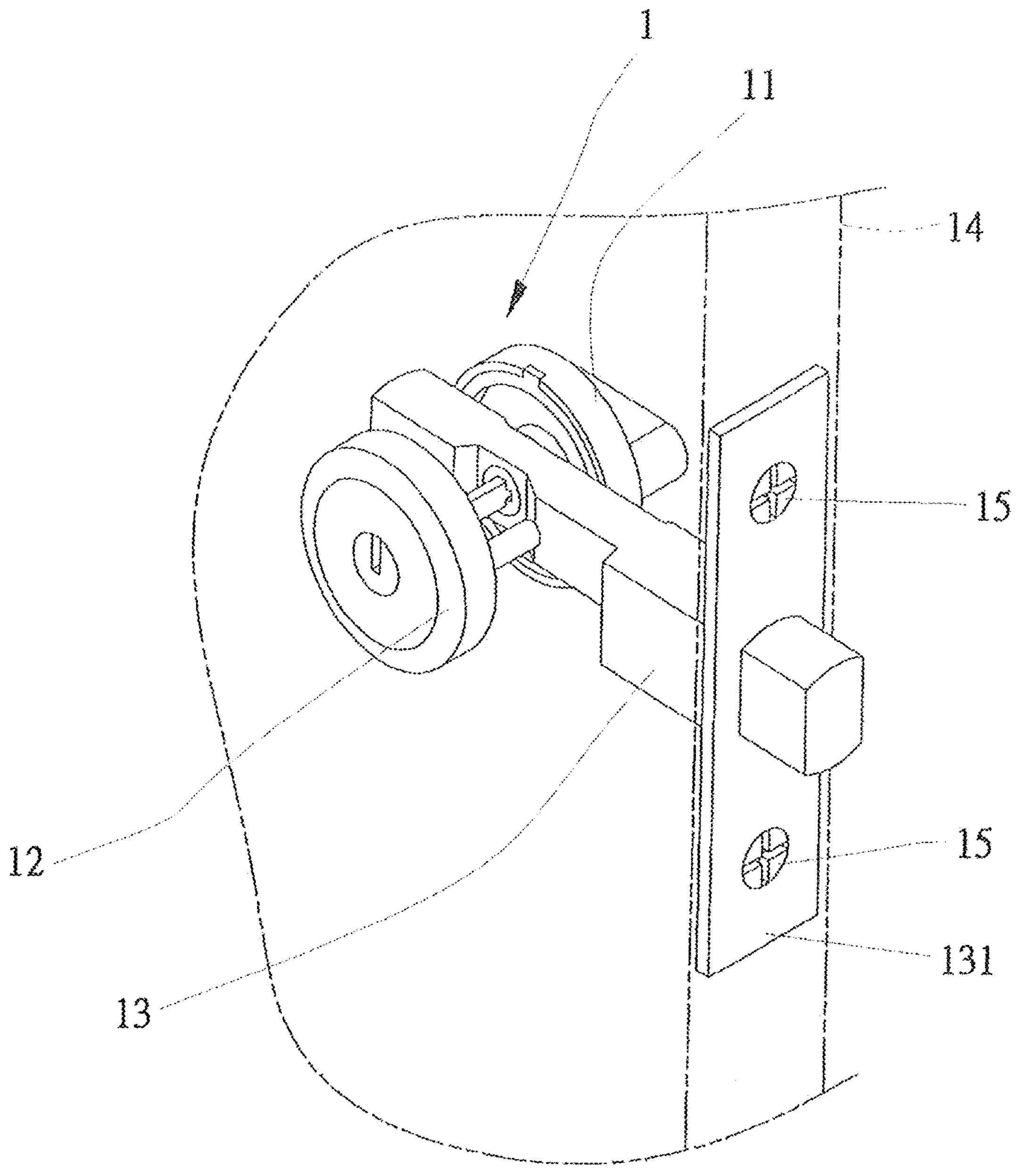
FIG. 1 is a perspective view of a conventional door lock according to PRIOR ART assembled on a door sheet.
Figure 2:
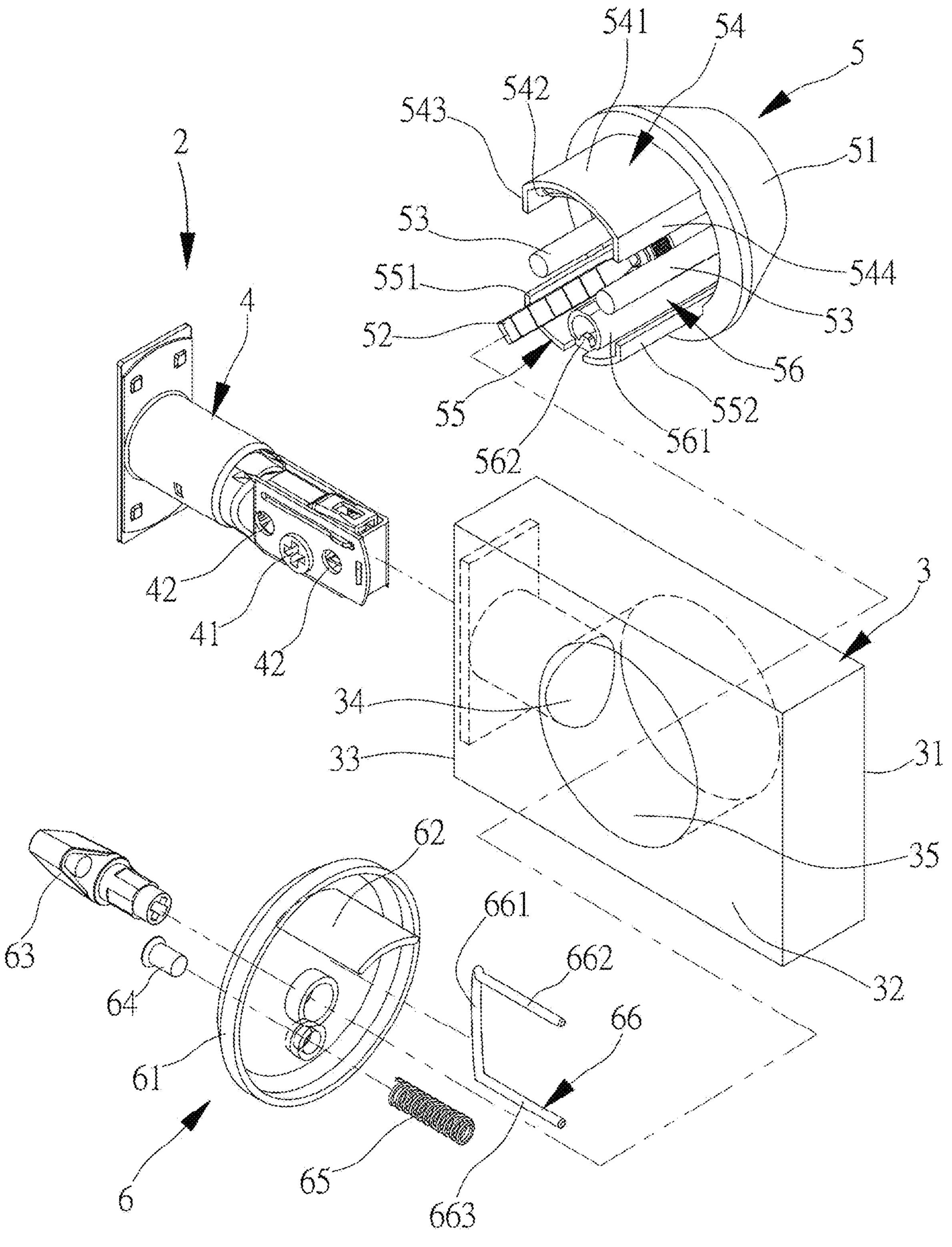
FIG. 2 is an exploded view of a door lock according to a preferred embodiment of the present invention and a door sheet.
Figure 3:
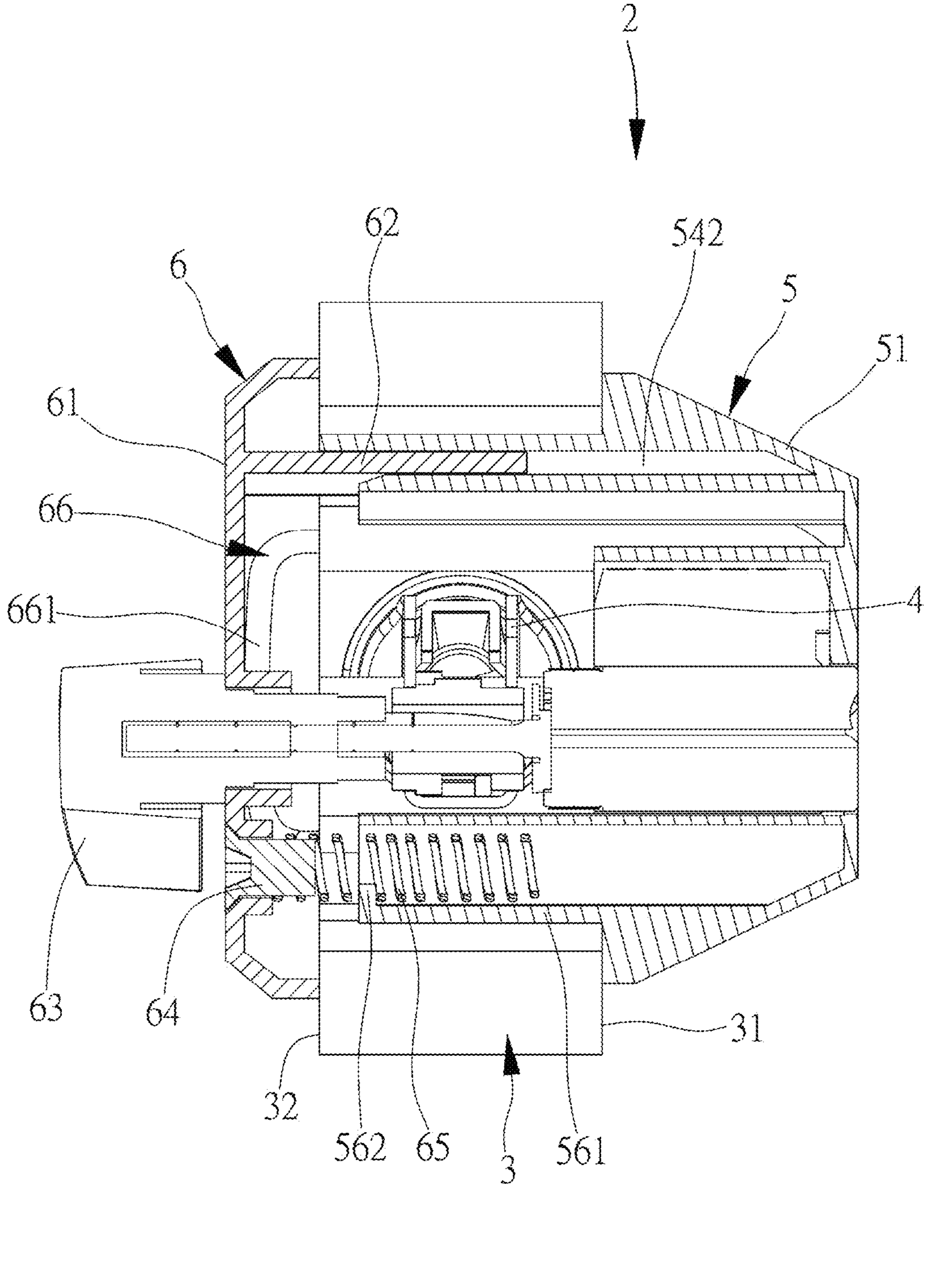
FIG. 3 is a sectional view of the door lock according to the above preferred embodiment of the present invention assembled on a door sheet.
Figure 4:
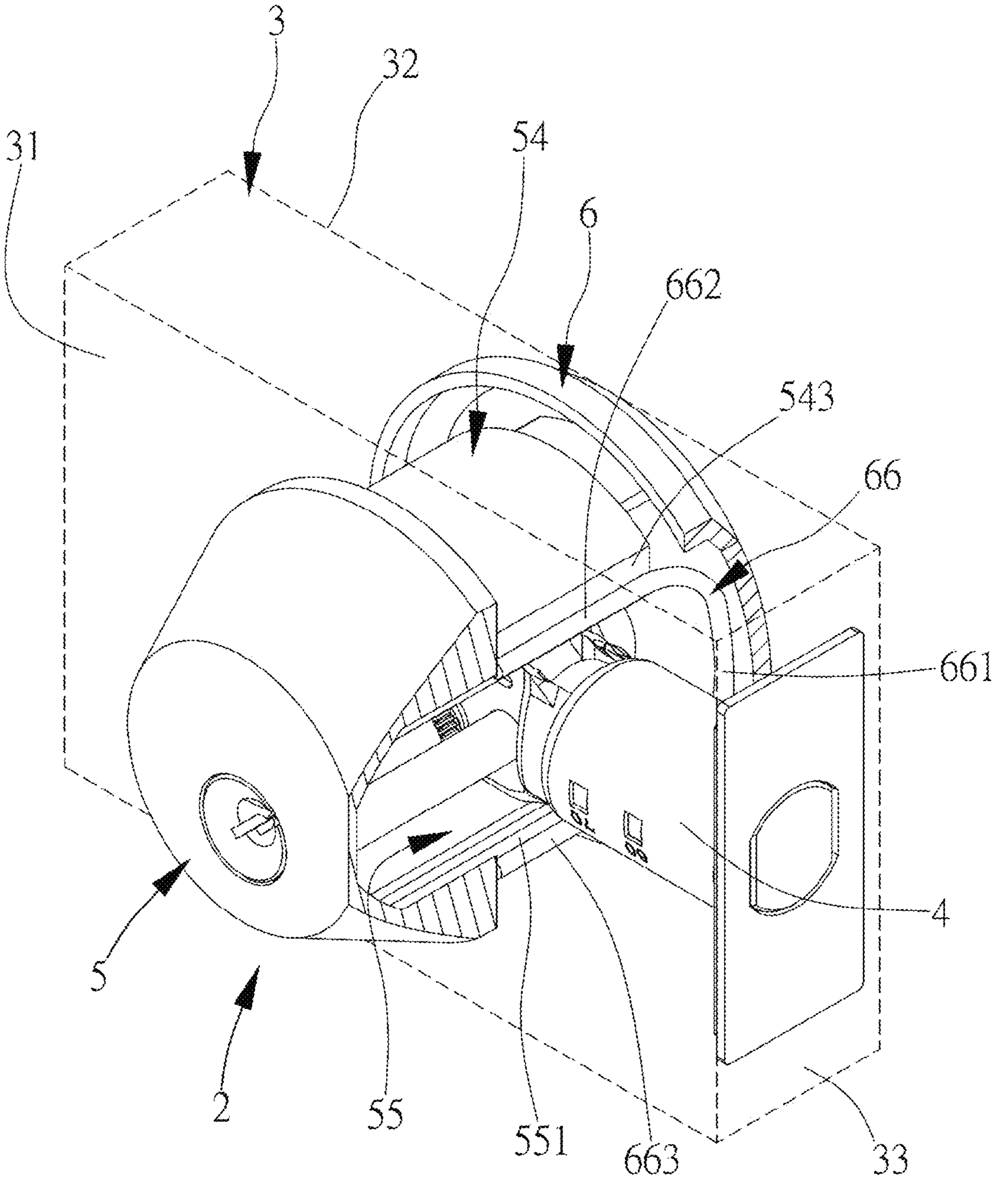
FIG. 4 is a perspective view of the door lock according to the above preferred embodiment of the present invention assembled on a door sheet.

Referring to FIGS. 2-4, the door lock 2 according to a preferred embodiment of the present invention is assembled on a door sheet 3. The door sheet 3 has a first surface 31, a second surface 32, a lateral margin 33, an assembling hole 35 penetrating the first surface 31 and the second surface 32, and a latch slot 34 concavely arranged on the lateral margin 33. The first surface 31 and the second surface 32 are embodied as the outer side and the inner side respectively. The latch slot 34 is connected and communicated with the assembling hole 35. The door lock comprises a latch 4, a first locking mechanism 5, and a second locking mechanism 6.

The latch 4 is assembled in the latch slot 34 and extended into the assembling hole 35 and has a core lock hole 41 and two guide holes 42.

The first locking mechanism 5 is assembled in the assembling hole 35 from the first surface 31 of the door sheet 3, and comprises an outer lock member 51, a linkage bar 52 pivoted on the outer lock member 51, two guide bars 53 extended from the outer lock member 51, an upper engaging member 54 and a lower engaging member 55 respectively protrudingly arranged from the outer lock member 51, and a buckle member 56, wherein the linkage bar 52 is adapted to penetrate the core lock hole 41, so as to position the latch 4 relatively to the outer lock member 51, wherein the upper engaging member 54 has s first upper engaging portion 543 and a second upper engaging portion 544 respectively bent and extended from the two sides of the arc connection portion 541, wherein the first upper engaging portion 543 and the second upper engaging portion 544 are arranged opposite, correspondingly, and parallel to each other, wherein the lower engaging member 55 has a first lower engaging portion 551 and a second lower engaging portion 552, which are opposite arranged in a top and bottom manner with the first upper engaging portion 543 and the second upper engaging portion 544, respectively. The buckle member 56 is arranged between the first lower engaging portion 551 and the second lower engaging portion 552 and has a pipe 561 and a upward bulge 562 protruded from the inside of said pipe 561.

The second locking mechanism 6 is arranged on the second surface 32 of the door sheet 3 and comprises an inner cover 61, an engaging bolt rib 62 extended from the inner cover 61, a rotating member 63 penetrating the inner cover 61 to connect with the linkage bar 52, a turning member 64 pivotally arranged on the inner cover 61, a spiral resilient member 65 connected with the turning member 64, and an engaging member 66 arranged on the inner cover 61, wherein the engaging bolt rib 62 is adapted to correspondingly inserted into the track slot 542, wherein the rotating member is adapted to drive the linkage bar 52 to open and close the latch 4, wherein the spiral resilient member 65 is arranged in the pipe 561 in a penetrating manner and adapted to be screwed and screw and abut against said bulge 562, wherein said engaging member 66 has an upper engaging section 662 and a lower engaging section 663 arranged in parallel and abutted against the bulge 562. The engaging member 66 has a rigid coupling section 661, affixed on the inner cover 61 and an upper engaging section 662 and a lower engaging section 663 respectively bent and extended from the two ends of the rigid coupling section 661 and provided in an up and down manner with each other. The upper engaging section 662 and the lower engaging section 663 are respectively adapted to flexibly abut against the first upper engaging portion 543 and the first lower engaging portion 551.

Figure 5:
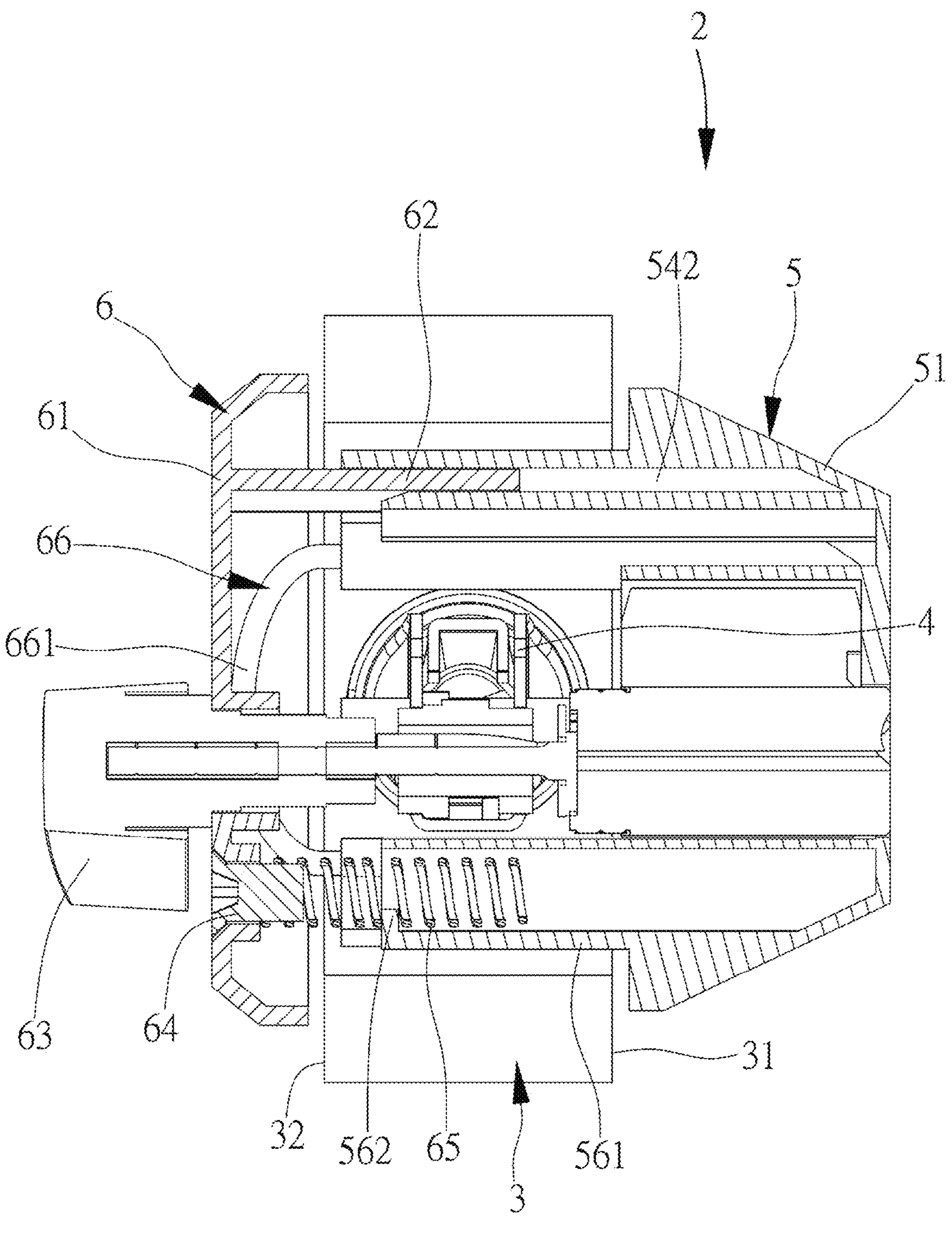
FIG. 5 is a sectional view of the door lock according to the above preferred embodiment of the present invention provided on a door sheet without fastening.

When the door lock 2 is assembled with respect to the door sheet 3, the latch 4 is first inserted into the assembling hole 35 through the latch slot 34, and the outer lock member 51 of the first locking mechanism 5 is assembled from the first surface 31 toward the assembling hole 35, so that the linkage bar 52 and the guide bar 53 are respectively penetratingly provided in the guide holes corresponding to the core lock hole 41. Then, the second locking mechanism 6 is to be assembled from the second surface 32 toward the assembling hole 35. When the inner cover 61 is close to the second surface 32, the engaging bolt rib 62 thereon is correspondingly embedded in the track slot 542, and the rotation of the turning member 64 will drive the spiral resilient member 65 to screw into the pipe 561 corresponding to the bulge 562. Meanwhile, the upper engaging section 662 and the lower engaging section 663 of the engaging member 66, as illustrated in FIG. 4, respectively flexibly contact the first upper engaging portion 543 and the first lower engaging portion 551, thereby limiting the lateral movement of the first locking mechanism 5 and the latch 4, thereby achieving an automatic positioning effect in the lateral direction. At this time, the door lock 2 is still in the state that has not been fully locked, as illustrated in FIG. 5. Then the turning member 64 is further driven and turned by the tool, so that the spiral resilient member 65 is further screwed into the pipe 561 relative to the bulge 562, and finally the first locking mechanism 5 and the second locking mechanism 6 are locked relative to the door sheet 3, as illustrated in FIG. 3.

It can be seen from the above illustration of assembling that according to the present invention, the first locking mechanism 5 and the second locking mechanism 6 of the door lock 2 are coupled on the door sheet 3 with respect to the latch 4, and the engaging member 66 will automatically abuts against and engages with the upper engaging member 54 and the lower engaging member 55 so as to limit the first locking mechanism 5 and the latch 4 from moving laterally, and the rotation of the turning member 64 can simultaneously lock the latch 4, the first locking mechanism 5, and the second locking mechanism 6 on the door sheet 3. More specifically, the door lock 2 can be quickly locked and affixedly arranged on the door sheet 3 through rotating the turning member 64 with a power tool. Therefore, the door lock 2 of the present invention has the technical effects of quick assembling and convenient assembling, and moreover, the abutting and engaging structures among the engaging member 66, the upper engaging member 54, and the lower engaging member 55, and the spiral resilient member 65 and the bulge 562 are very simple, which not only are easy to manufacture, but further reduce the manufacturing costs.

It should be further noted that since the spiral resilient member 65 has the characteristic of being elastically buckled on the bulge 562, the door lock 2 can still be effectively assembled on the door sheet 3 even when the thickness of the door sheet 3 is somewhat different. Besides, the design accuracy of the coordination among the engaging member 66 and the upper engaging member 54 and the lower engaging member 55 is not highly required because the engaging member 66 is also resilient. Accordingly, this can further reduce the manufacturing costs. Furthermore, the first locking mechanism 5 and the second locking mechanism 6 of the door lock 2 according to the present invention can also cooperate with a latch with a telescopic length function, so as to fit door sheets of different specifications, and the latch with a telescopic length is a conventional structure, which details will not be unnecessarily given here.

Figure 6:
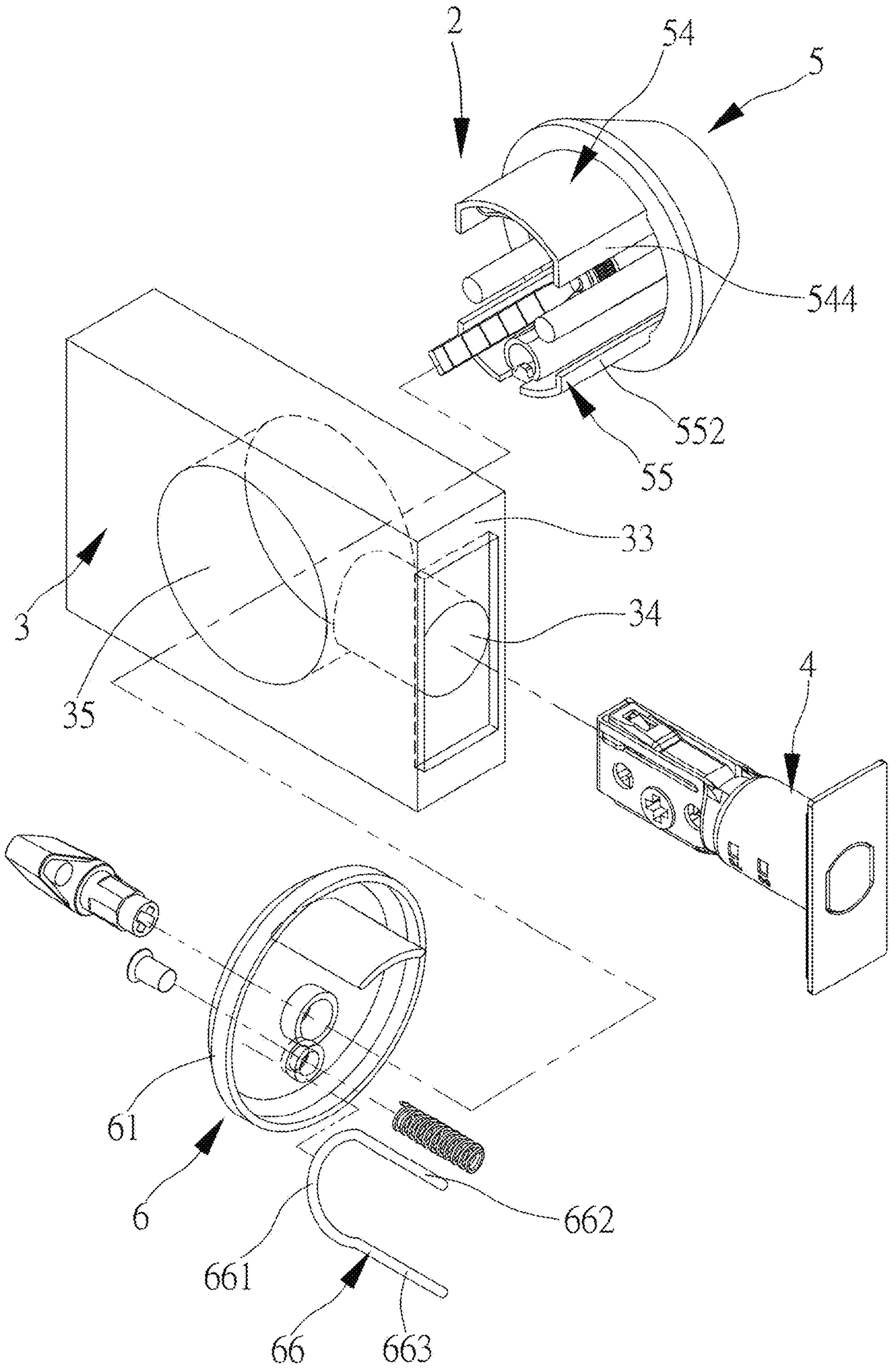
FIG. 6 is an exploded view of a door lock according to another preferred embodiment of the present invention and a door sheet.

Referring to FIG. 6, an application scenario of another embodiment is illustrated. When the latch slot 34 of the door sheet 3 and the assembling hole 35 are formed on the other lateral margin 33 of the door sheet 3, the latch 4 is also assembled in the latch slot 34 and the first locking mechanism 5 and the second locking mechanism 6 are also locked on the door sheet 3. The only difference is that the rigid coupling section 661 of the engaging member 66 is assembled on the other side of the inner cover 61, and the upper engaging section 662 and the lower engaging section 663 thereof are respectively elastically abutted against and engaged with the second upper engaging portion 544 of the upper engaging member 54 and the second lower engaging portion 552 of the lower engaging member 55, which as well provides the function of laterally positioning the latch 4 and the first locking mechanism 5. In other words, the door lock 2 of the present invention can be adapted to the door sheet 3 of the left opening or the right opening merely through changing the position of the engaging member 66, which therefore improves the applicability of the door lock 2.

What is claimed is:

1. A door lock, adapted for being assembled on a door sheet, wherein the door sheet has a first surface, a second surface, a lateral margin, an assembling hole penetrating the first surface and the second surface, and a latch slot concavely arranged on the lateral margin, wherein the latch slot is connected and communicated with the assembling hole, wherein said door lock comprises:

a latch, assembled in the latch slot and extended into the assembling hole and has a core lock hole and two guide holes;

a first locking mechanism, adapted for being assembled in the assembling hole from the first surface of the door sheet, and comprising an outer lock member, a linkage bar pivoted on said outer lock member, two guide bars extended from said outer lock member, an upper engaging member and a lower engaging member respectively protrudingly arranged from said outer lock member, and a buckle member, wherein said linkage bar is adapted to penetrate said core lock hole, wherein said guide bars respectively pass through said guide holes, wherein said upper engaging member has a first upper engaging portion, wherein said lower engaging member has a first lower engaging portion, wherein said first upper engaging portion and said first lower engaging portion are opposite arranged in a top and bottom manner, wherein said buckle member has a pipe and a bulge protruded from the inside of said pipe; and a second locking mechanism, arranged on the second surface of the door sheet and comprising an inner cover, a rotating member penetrating said inner cover to connect with said linkage bar, a turning member pivotally arranged on said inner cover, a spiral resilient member connected with said turning member, and an engaging member arranged on said inner cover, wherein said spiral resilient member is arranged in said pipe in a penetrating manner and adapted to be driven by said turning member to screw and abut against said bulge, wherein said engaging member has an upper engaging section and a lower engaging section arranged in parallel and up and down manner with each other, and respectively abut and contact with said first upper engaging portion and said first lower engaging portion.

2. The door lock, as recited in claim 1, wherein said upper engaging member further comprises an arc connection portion, and a second upper engaging portion bent and extended from a side of said arc connection portion, wherein said first upper engaging portion is bent and extended from the other side of said arc connection portion and corresponding to said second upper engaging portion in parallel, wherein said lower engaging member further has a second lower engaging portion opposite to said second upper engaging portion.

3. The door lock, as recited in claim 2, wherein said upper engaging member further has a track slot formed inside said arc connection portion, wherein said second locking mechanism further has an engaging bolt rib extended from said inner cover, wherein said engaging bolt rib is adapted to be correspondingly embedded in said track slot.

4. The door lock, as recited in claim 1, wherein said engaging member further has a rigid coupling section affixedly arranged on said inner cover, wherein said upper engaging section and said lower engaging section are bent from both ends of said rigid coupling section.

* * * * *